US 6,362,863 B1

(12) United States Patent
Kataoka et al.

(10) Patent No.: US 6,362,863 B1
(45) Date of Patent: Mar. 26, 2002

(54) LIQUID CRYSTAL DISPLAY DEVICE WITH SAW-TOOTH ALIGNMENT CONTROL LAYER

(75) Inventors: Shingo Kataoka; Katsufumi Ohmuro, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/398,329

(22) Filed: Sep. 17, 1999

(30) Foreign Application Priority Data

Sep. 18, 1998 (JP) .......................................... 10-265563
Sep. 8, 1999 (JP) .......................................... 11-254336

(51) Int. Cl.$^7$ ............................................ G02F 1/1337
(52) U.S. Cl. ........................ 349/123; 349/124; 349/130
(58) Field of Search .............................. 349/123, 124, 349/130

(56) References Cited

U.S. PATENT DOCUMENTS 5,657,102 A * 8/1997 Mitzushima et al. ....... 349/124

FOREIGN PATENT DOCUMENTS

| JP | 6060624 | 4/1985 | |
| JP | 60217339 | 10/1985 | |
| JP | 60217340 | 10/1985 | |
| JP | 60244925 | 12/1985 | |
| JP | 61248021 | 11/1986 | |
| JP | 194318 | 4/1989 | |
| JP | 5188377 | 7/1993 | |
| JP | 5249465 | 9/1993 | |
| JP | 6-167711 | * 6/1994 | ................. 349/132 |
| JP | 6-214236 | * 8/1994 | ................. 349/132 |
| JP | 8114804 | 5/1996 | |
| JP | 9152612 | 6/1997 | |
| TW | 84213935 | 10/1986 | |

* cited by examiner

Primary Examiner—Toan Ton
(74) Attorney, Agent, or Firm—Greer, Burns & Crain, Ltd.

(57) ABSTRACT

A liquid crystal display device includes alignment control layers provided on the inner sides of the substrates and having a saw-tooth cross-section with slopes inclinating at an angle relative to the substrate. The device also has alignment layers covering the alignment control layers and in contact with the liquid crystal. The alignment layers are alignment-treated in a conventional method, and provide a pretilt angle of the liquid crystal. The slope of the alignment control layer acts to increase the pretilt angle.

8 Claims, 11 Drawing Sheets

LIQUID CRYSTAL DISPLAY DEVICE WITH SAW-TOOTH ALIGNMENT CONTROL LAYER

BACKGROUND OF THE INVENTION

1. Field of the Invention

The present invention relates to a liquid crystal display device, in particularly, to a liquid crystal display device having alignment layers used for alignment control.

2. Description of the Related Art

In the prior art liquid crystal display devices using active elements, a TN (twisted nematic) mode liquid crystal has been mainly used, wherein a liquid crystal having a positive anisotropy of dielectric constant is inserted between a pair of substrates so that liquid crystal molecules are aligned generally in the horizontal direction relative to the surface of the respective substrate, and the alignment direction of the liquid crystal molecules is twisted at 90 degrees between the opposed substrates. This TN mode liquid crystal, however, has a drawback in that a good viewing angle is small.

To improve the viewing angle characteristic, a VA (vertically aligned) mode liquid crystal is proposed in place of the TN mode liquid crystal, wherein a liquid crystal having a negative anisotropy of its dielectric constant is inserted between a pair of substrates so that liquid crystal molecules are aligned generally in the vertical direction relative to the surface of the respective substrate.

In this VA mode, however, it is necessary to carry out an alignment division to eliminate the reversal of brightness at a middle tone. As one method for carrying out the alignment division, there is a newly developed alignment method using irradiation with ultraviolet light. This alignment method using irradiation with ultraviolet light has an advantage in that the alignment direction can be controlled in a non-contact manner with the alignment layer. According to the method for controlling the alignment direction by irradiation with ultraviolet light, however, there is a problem in that the pretilt angle becomes excessively small and results in a risk of reduction of contrast.

On the other hand, another type of liquid crystal display device has been proposed recently wherein a ferroelectric or anti-ferroelectric liquid crystal is used to realize a liquid crystal mode having a wider viewing angle and a quick response characteristic one thousand times faster than that of the TN mode liquid crystal.

There is a problem in this liquid crystal display device in that, because the liquid crystal material used therefor has a higher alignment property, it is very difficult to control the pretilt angle which is necessary for preventing defects of alignment from being generated, by solely relying on the capacity for generating a pretilt of the alignment layers on its own. This is one of reasons for the difficulty of applying the alignment method using irradiation with ultraviolet light.

FIGS. 21 to 23 illustrate the prior art and the problems thereof.

FIG. 21 illustrates a prior art liquid crystal panel using a ferroelectric liquid crystal, and FIG. 22 illustrates problems in the liquid crystal panel shown in FIG. 21.

As shown in FIG. 21, a liquid crystal panel 300 is composed of a pair of substrates 80 and 81 having electrodes 82 and 83 and alignment layers 84 and 85 of PVCi (polyvinyl cinnamate) formed on the inner sides thereof, respectively. A ferroelectric liquid crystal layer 86 is inserted between the pair of substrates 80 and 81. This liquid crystal panel 300 is referred to as a chevron structure of a ferroelectric liquid crystal wherein liquid crystal molecules 86a are disposed in a structure in consecutive bending layers.

According to the prior art liquid crystal panel 300, however, the liquid crystal molecules 86a are aligned generally in the horizontal direction relative to the surface of the substrates as shown in FIG. 21 to have a pretilt angle of generally zero degree, whereby there may be zones wherein the bending direction of the layered structure is reversed to result in a zigzag-alignment defect. FIG. 22 shows the zigzag-alignment defect including a hair pin defect 87 and a lightning defect 88 which deteriorates the display quality.

FIG. 23 illustrates another prior art liquid crystal panel wherein a VA mode liquid crystal is used. As shown in FIG. 23, a liquid crystal panel 400 is composed of a pair of substrates 90 and 91 having electrodes 92 and 93 and vertical alignment layers 94 and 95 of polyimide or polyamic acid on the inner sides thereof, respectively. The alignment treatment of the vertical alignment membrane 94 and 95 may be carried out by irradiation with ultraviolet light. Between the pair of substrates 90 and 91 is inserted a liquid crystal layer 96 formed of a liquid crystal having a negative anisotropy of dielectric constant.

In this liquid crystal panel 400, since the alignment treatment of the vertical alignment layers 94 and 95 is carried out by irradiation of ultraviolet ray, a pretilt angle $\theta p$ of the liquid crystal molecule 96a relative to the surface of the substrate is considerably reduced. This results in more leakage of light to decrease contrast.

Also, under such circumstances, the range of selection of materials for the alignment layers to which an alignment treatment by irradiation with ultraviolet light can applied might be limited, and the production cost rises.

SUMMARY OF THE INVENTION

The object of the present invention is to solve the problems in the alignment occurring due to the magnitude of a pretilt angle and to provide a liquid crystal display device having an excellent display quality.

A liquid crystal display device according to the present invention comprises a pair of substrates, a nematic liquid crystal layer inserted between the pair of substrates, an alignment control layer provided on the inner side of at least one of the substrates, the alignment control layer having a saw-tooth cross-section with slopes inclinated at an angle relative to the substrate, and an alignment layer covering the alignment control layer.

In this arrangement, in the liquid crystal display using a nematic liquid crystal, alignment of the liquid crystal can be controlled by the alignment control layer and the alignment layer, irrespective of kinds of materials or alignment treatment for the alignment layers, to realize a desired pretilt angle.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

The present invention will be described in more detail with reference to the preferred embodiments illustrated in the attached drawings.

Figure 1:
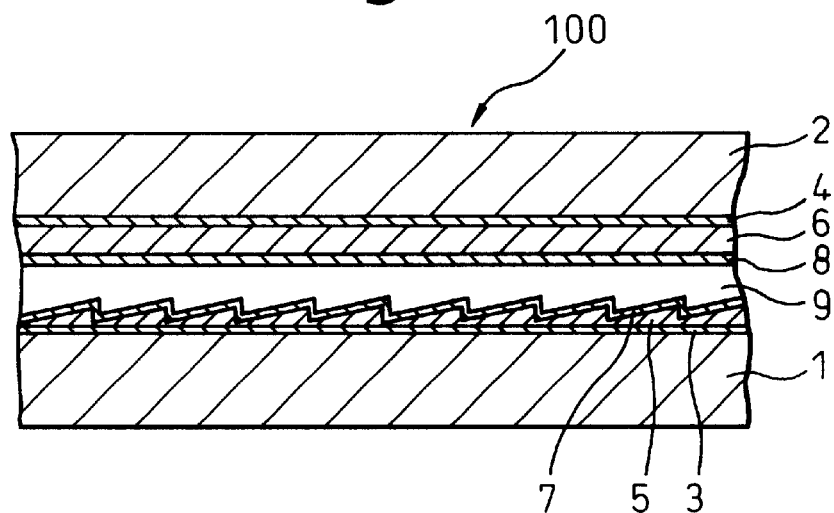
FIG. 1 is a cross-sectional view of a liquid crystal display device according to the first embodiment of the present invention.

FIG. 1 is a cross-sectional view of a liquid crystal display device according to the first embodiment of the present invention. The liquid crystal display device 100 is composed of a pair of glass substrates 1 and 2 having electrodes 3 and 4, formed of ITO, on the inner sides thereof, respectively. Alignment control layers 5 and 6 made of acrylic resin having a saw-tooth cross-sectional shape are provided on the electrodes 3 and 4. Opposite slopes of the alignment control layers 5 and 6 are formed to make an angle to the surfaces of the substrates 1 and 2, respectively. Alignment layers 7 and 8 are formed on the alignment control layers 5 and 6, respectively.

A liquid crystal layer 9 is inserted between the pair of glass substrates 1 and 2. The liquid crystal layer 9 is in contact with the alignment layers 7 and 8. In this embodiment, the liquid crystal layer 9 comprises a horizontally aligned nematic liquid crystal. Accordingly, the alignment layers 7 and 8 are also horizontal alignment layers. The liquid crystal display device 100 is a TN type liquid crystal display device, and the alignment layers 7 and 8 are treated by rubbing in mutually perpendicular directions. Also, the opposed slopes of the alignment control layers 5 and 6 are disposed in mutually perpendicular directions. In this regard, in FIG. 1, the alignment control layer 6 is shown in the cross-section passing through the top region of the slope thereof.

Figure 2:
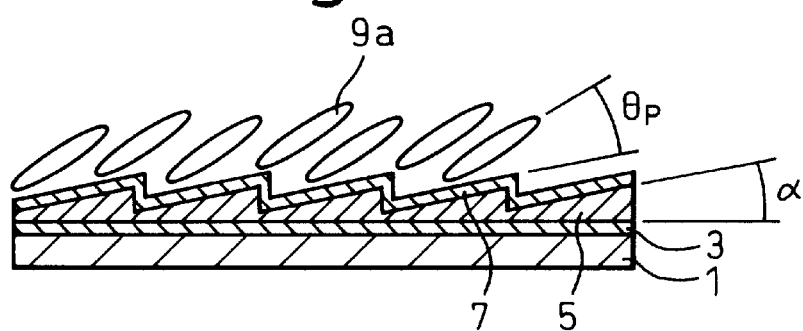
FIG. 2 is a cross-sectional view of one substrate and liquid crystal molecules in the vicinity thereof in FIG. 1.
Figure 3:
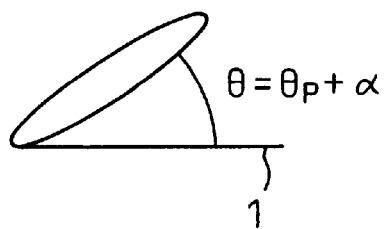
FIG. 3 is a view illustrating a pretilt angle of the liquid crystal molecules of FIGS. 1 and 2.

FIG. 2 illustrates the substrate 1 and the liquid crystal molecules 9a in the vicinity thereof. FIG. 3 explains a pretilt angle of the liquid crystal molecules 9a. The inclination angle of the saw-tooth shape of the alignment control layer 5 is $\alpha$ relative to the surface of the substrate 1. Accordingly, the surface of the alignment layer 7 which contributes most to the alignment of the liquid crystal molecule 9a also makes an angle $\alpha$ to the surface of the substrate 1. The alignment layer 7 is subjected to an alignment treatment such as rubbing so that a pretilt angle of the liquid crystal molecule 9a based on the alignment layer 7 (a pretilt angle relative to the surface of the alignment layer 7) becomes $\theta p$.

Therefore, a pretilt angle $\theta$ of the liquid crystal molecule 9a relative to the substrate 1 becomes $\theta = \theta p + \alpha$, as shown in FIG. 3.

By such an arrangement, it is possible to adjust the pretilt angle $\theta$ of the liquid crystal to an optional value. In other words, although there is a limit in a controllable range of the pretilt angle based solely on the alignment layer 7, a desirable pretilt angle, which is usually difficult to achieve solely by the alignment layer 7, can be obtained by combining the alignment layer 7 with the saw-tooth alignment control layer 5, and by selecting a proper inclination angle of the slope of the alignment control layer 5.

Accordingly, it is possible to realize a pretilt angle larger or smaller than that caused by the alignment layer 7. Also, it is possible to obtain a horizontal alignment state having no pretilt angle at all. Further, a higher pretilt angle in the range from 15 degrees to 30 degrees may be easily obtainable.

Thus, by using the arrangement of the present invention, problems in the alignment occurring from the magnitude of a pretilt angle is solved, and a liquid crystal display device having a good display quality can be realized. Also, by using the arrangement of the present invention, an optical alignment method such as that using irradiation with ultraviolet light, by which it has been difficult to control the pretilt angle, is easily and widely applicable.

Figure 4:
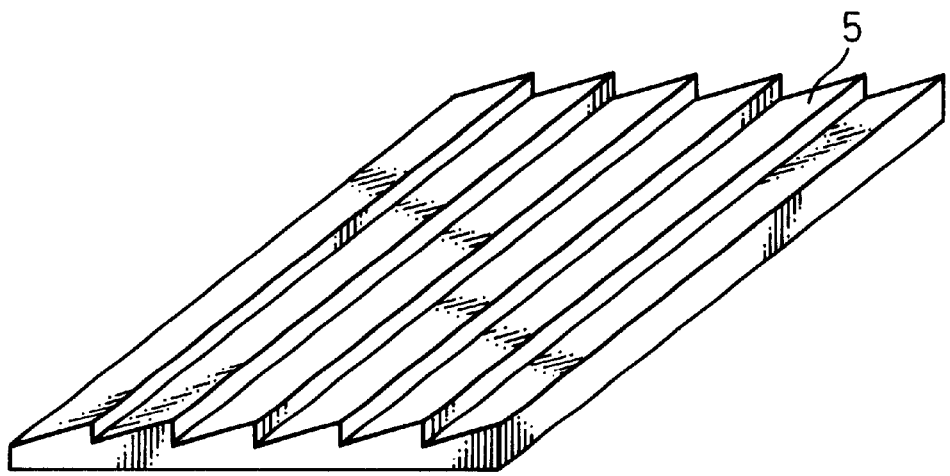
FIG. 4 is a perspective view of the alignment control layer in FIG. 1.
Figure 5:
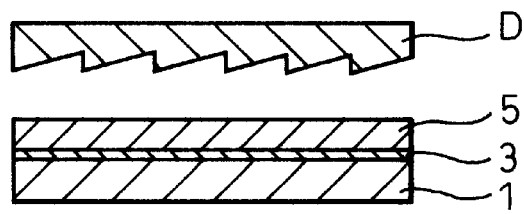
FIG. 5 is a view illustrating a method for forming a saw-tooth configuration of the alignment control layer shown in FIG. 1.
Figure 6:
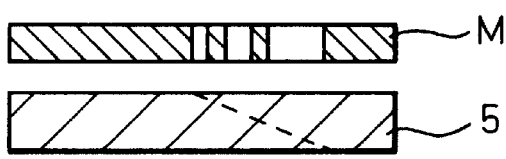
FIG. 6 is a view illustrating another method for forming a saw-tooth configuration of the alignment control layer shown in FIG. 1.

FIG. 4 is a perspective view illustrating the alignment control layer 5. The alignment control layers 5 and 6 can be formed by a method using a die (see FIG. 5) or a method using a photosensitive resin and irradiating ultraviolet light (see FIG. 6). FIG. 5 shows that a material for the alignment control layer 5 is coated onto the electrode 3 and the die D is pressed onto the material of the alignment control layers. FIG. 6 shows that an ultraviolet ray UV is applied onto the photosensitive resin forming the alignment control layer 5 through a mask M. The mask M has openings the sizes of which change in a stepwise manner, whereby a saw-tooth configuration having slopes are formed.

Figure 7:
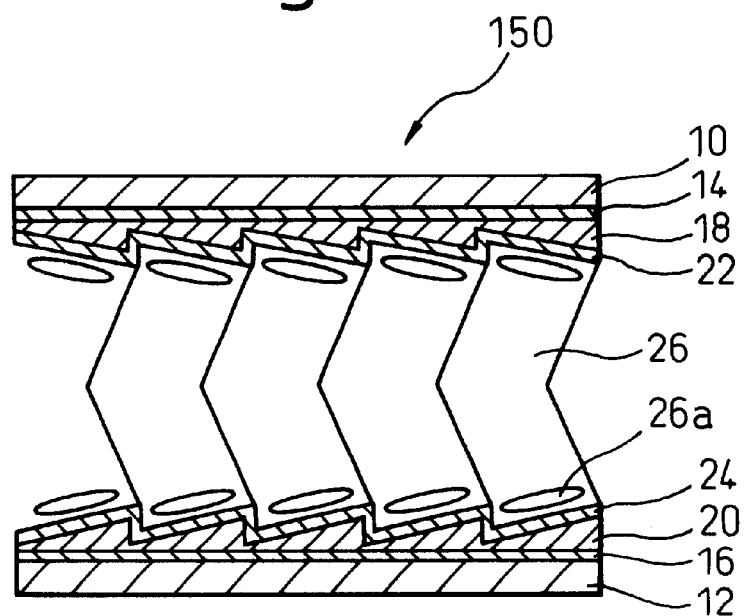
FIG. 7 is a cross-sectional view of a liquid crystal display device according to the second embodiment of the present invention.

FIG. 7 illustrates a liquid crystal display device according to the second embodiment of the present invention. The liquid crystal display device 150 shown in FIG. 7 uses a ferro-electric liquid crystal of a chevron structure. The liquid crystal display device 150 is composed of a pair of glass substrates 10 and 12 having electrodes 14 and 16 of ITO. Alignment control layers 18 and 19 having a saw-tooth cross-section and made of acrylic resin are formed on the electrodes 14 and 16. A liquid crystal layer 26 is present between alignment layers 22 and 24. Material for the liquid crystal layer is a smectic liquid crystal exhibiting ferro-electricity (TA-C100 available from Chisso K.K.), and the cell thickness is 1.5 μm.

Alignment layers 22 and 24 made of PVCi (polyvinyl cinnamate) are formed on the alignment control layers 18 and 20, respectively. The alignment control layers 18 and 20 are disposed so that opposite slopes thereof make an angle to each other; i.e., in a non-parallel manner. The alignment control layers 18 and 20 are formed by molding using a die or irradiation with ultraviolet light using photosensitive resin in the same manner as described above. The alignment of the alignment layers 22 and 24 is controlled by an optical alignment method.

Figure 8:
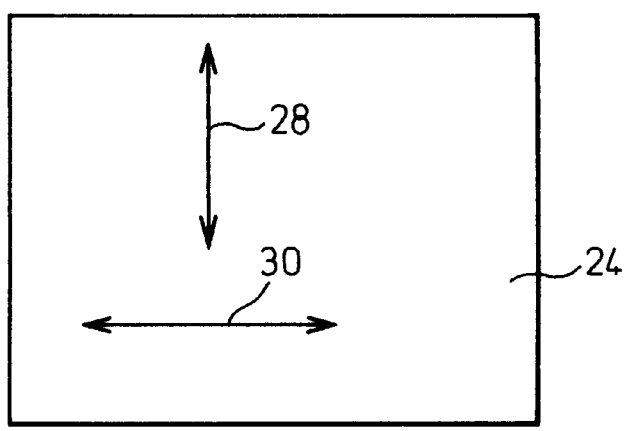
FIG. 8 is a view illustrating the alignment treatment for the alignment layer of FIG. 7.
Figure 9:
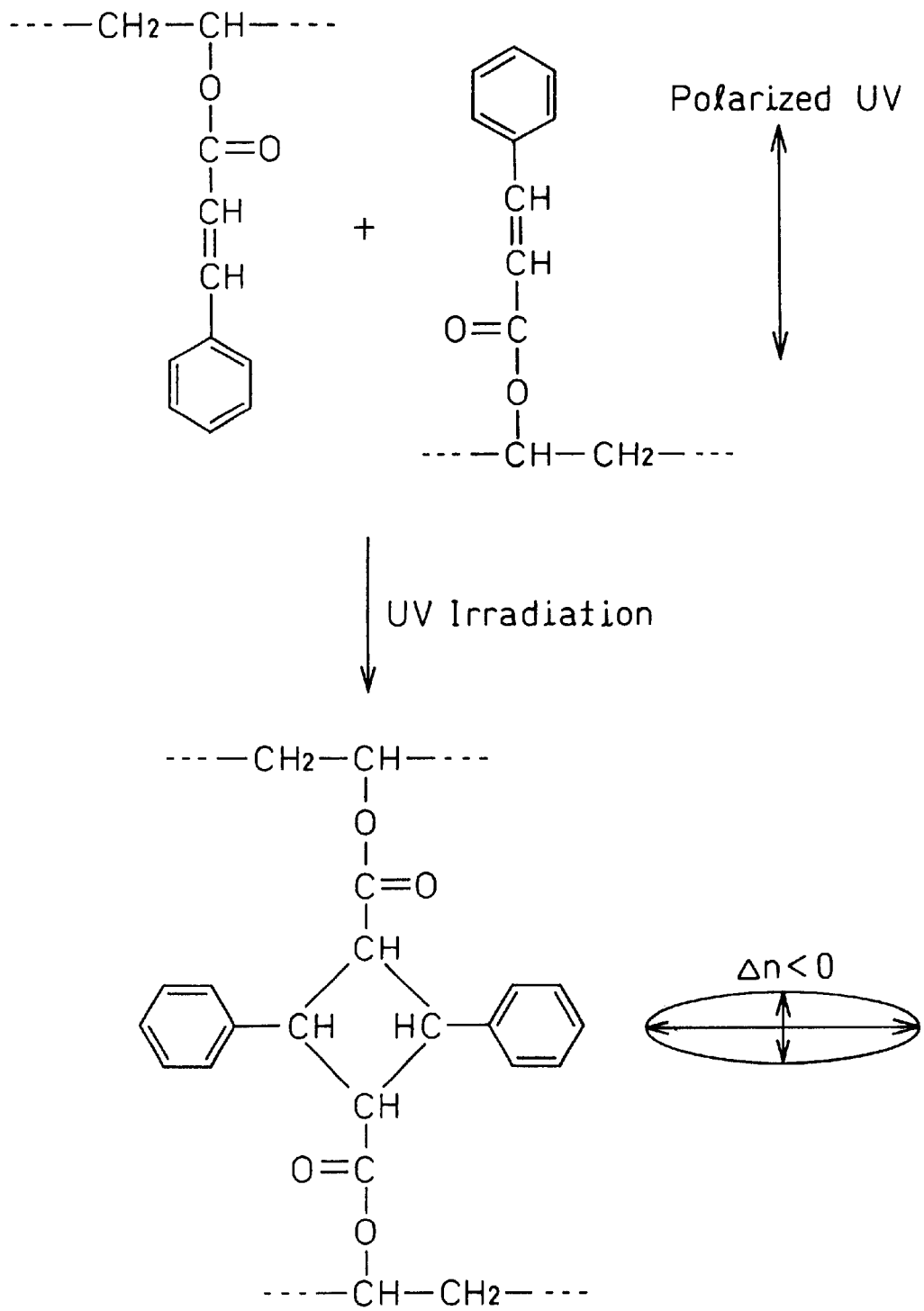
FIG. 9 is a view illustrating an example of the alignment layer of FIG. 7.

FIG. 8 shows an alignment control method using an optical alignment method, which is applied to the alignment layers 22 and 24 of PVCi. FIG. 9 shows the structure of PVCi and a photodimerization reaction. The alignment layers 22 and 24 are alignment-treated by the photodimerization reaction. When polarized ultraviolet light (polarized in the arrowed direction 28) is irradiated onto the surface of the PVCi layer 24, the liquid crystal molecules 26a align in the direction 30 perpendicular to the polarization direction. More specifically, as shown in FIG. 9, photodimerization occurs in PVCi by the irradiation with ultraviolet light to cause crosslinkage. After the photodimerization, PVCi has a structure wherein benzene rings are coupled to each other, resulting in a negative optical anisotropy in the direction of the benzene-to-benzene pairs. The liquid crystal molecules 26a align in this direction.

Figure 22:
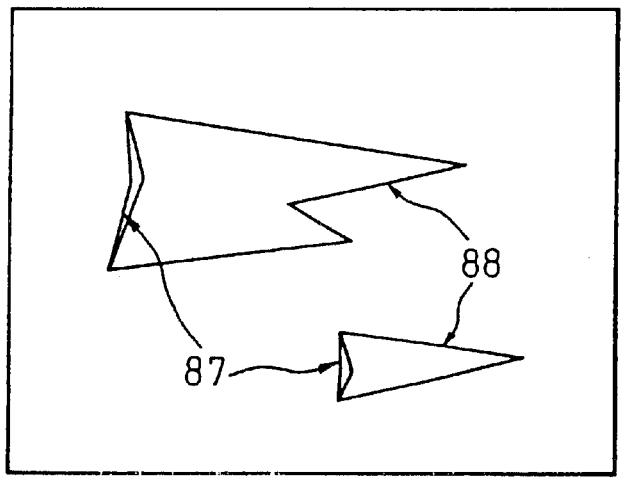
FIG. 22 is a view illustrating a prior art.
Figure 23:
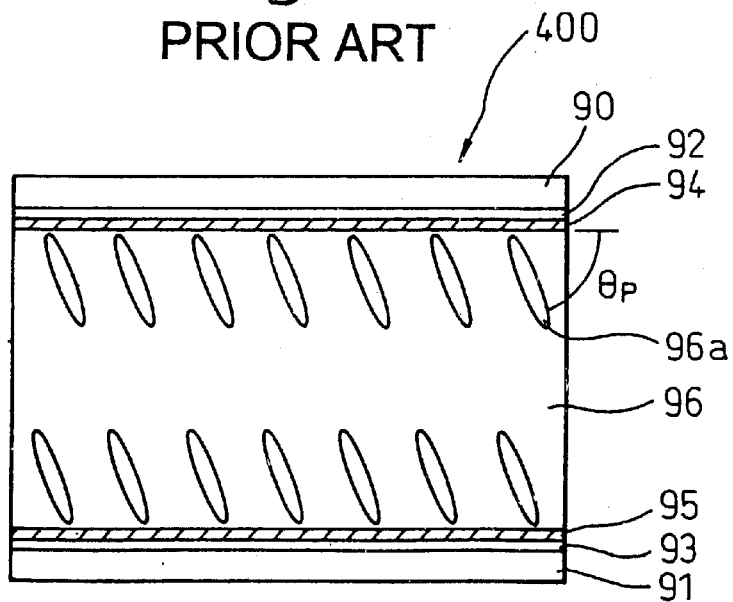
FIG. 23 is a view illustrating a prior art.

If the liquid crystal display device is produced using this optical alignment method, the alignment (azimuth) of the liquid crystal is favorably controllable, but a pretilt angle of the liquid crystal becomes substantially zero when the liquid crystal display device is used. This is liable to cause the zigzag defect or lightning defect shown in FIG. 22. To prevent such defects from occurring, the increase in pretilt angle is effective.

According to the present invention, it is possible to realize a large pretilt angle closer to 20 degrees relative to the surfaces of the substrates 10 and 12 by providing the alignment control layers 10 and 20. If the alignment control layers 18 and 20 could be disposed so that the opposed slopes of the opposed substrates 10 and 12 are parallel to each other, the zigzag defect might be avoidable to some extent. However, there are still defects because the bending position of the liquid crystal layer of the chevron structure is random. Contrarily, according to this embodiment, since the opposed slopes of the alignment control layers 18 and 20 of the opposed substrates 10 and 12 are not disposed in parallel to each other, the bending position of the liquid crystal layer becomes uniform to eliminate the defects.

Figure 10:
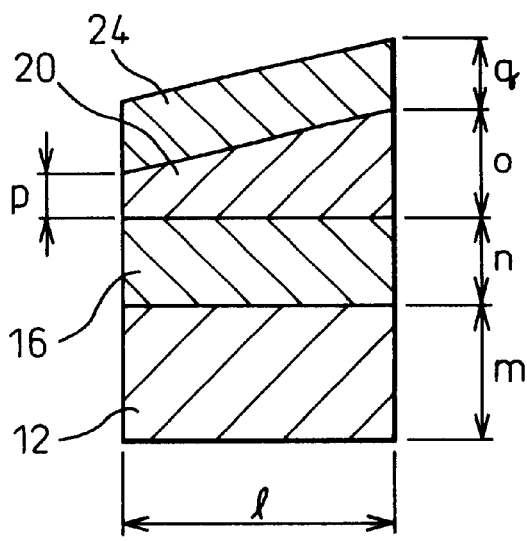
FIG. 10 is a view illustrating an example of the thicknesses of the layers formed on the substrate of the liquid crystal display device of FIG. 7.

FIG. 10 shows an example of dimensions of the alignment control layer 20 formed on the electrode 16 (having a thickness n, for example, of 0.1 μm) which in turn is formed on the glass substrate 12 (having a thickness m, for example, of 700 μm). The length of one saw-tooth of the alignment control layer 20 is 1.0 μm; the height o of a larger portion of the saw-tooth is 0.4 μm and the height p of a smaller portion thereof is 0.1 μm or less. A thickness q of the alignment layer 24 is 0.03 μm. The same is true of the other alignment control layer 18.

Figure 12:
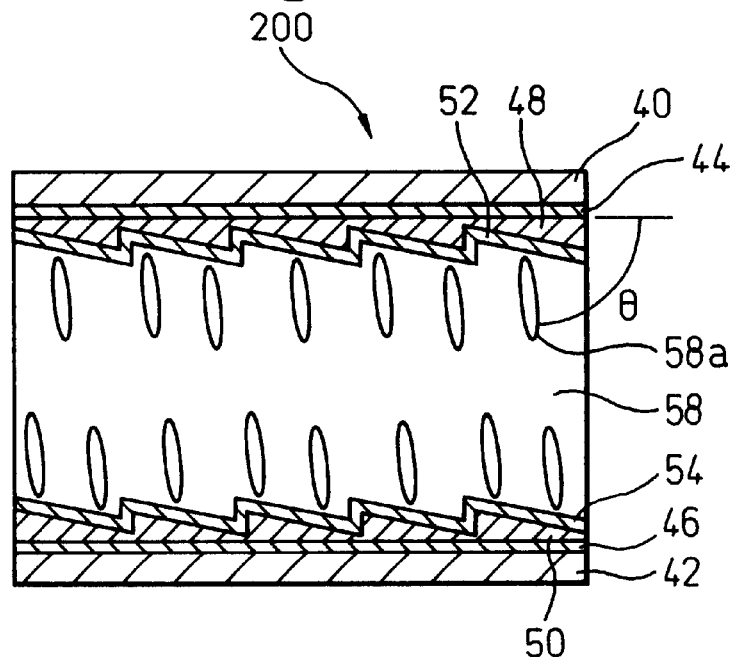
FIG. 12 is a cross-sectional view of the liquid crystal display device according to the third embodiment of the present invention.

FIG. 12 illustrates a liquid crystal display device according to the third embodiment of the present invention. The liquid crystal display device 200 uses a VA mode liquid crystal. The liquid crystal display device 200 is composed of a pair of glass substrates 48 and 50, transparent electrodes 44 and 46, alignment control layers 48 and 50 having a saw-tooth cross-section, vertical alignment layers 52 and 54 made of polyimide or polyamic acid, and a liquid crystal layer 58. Nematic liquid crystal (MJ-961213, available from Merck) having a negative anisotropy of dielectric constant is used as a liquid crystal material, and a cell thickness is 3.5 μm. The vertical alignment layers 52 and 54 are made of polyimide or polyamic acid.

The pair of substrates 40 and 42 are disposed so that opposed slopes of the alignment control layers 48 and 50 thereof are parallel to each other. The vertical alignment layers 52 and 54 are subjected to an alignment treatment by a light irradiation method wherein non-polarized ultraviolet light is irradiated in the direction at 45 degree to the vertical alignment layers 52 and 54. In this light irradiation method, among groups of polymers constituting the vertical alignment layers 52 and 54, which contribute to the vertical alignment, there are groups causing the liquid crystal molecules to tilt in the direction of the irradiation of ultraviolet ray and another groups causing the liquid crystal molecules to tilt in the reverse direction, whereby one of the groups is broken and the only other group is left. The alignment action accompanying a pretilt angle is carried out by the group thus left.

In the liquid crystal panel device 200 of this embodiment, although the liquid crystal molecules 58a have a relatively small pretilt angle of about 80 degrees to the aligned layers 52 and 54 after irradiation with ultraviolet light, a pretilt angle θ of the liquid crystal molecules 58a relative to the substrate is about 88 degrees because the inclination of the slope of the saw-tooth cross-section of the alignment control layers 48 and 50 is about 8 degrees (θ=θp+α). In such a manner, the alignment control layers 48 and 50 function to compensate for lack of a pretilt angle resulted from the alignment layers 52 and 54, whereby the liquid crystal panel 200 has a favorable alignment of the liquid crystal molecules closer to the vertical to an extent to not lower the contrast but sloped at a certain angle necessary for enhancing the switching operation.

Figure 11:
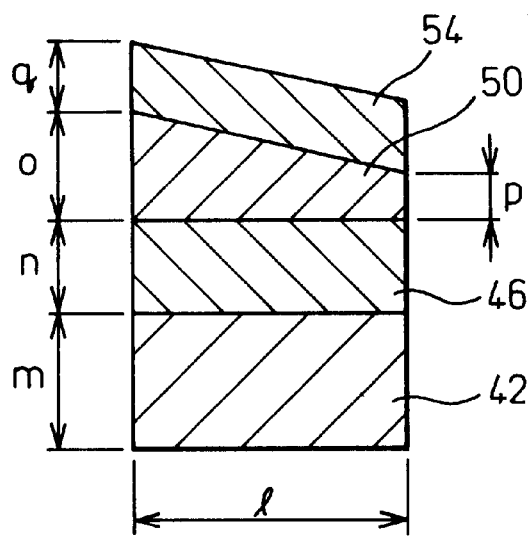
FIG. 11 is a view illustrating an example of the thicknesses of the layers formed on the substrate of the liquid crystal display device of FIG. 12.

FIG. 11 shows an example of dimensions of the alignment control layer 50 formed on the electrode 46 (having the thickness n, for example, of 0.1 μm) which in turn is formed on the glass substrate 42 (having the thickness m, for example, of 700 μm). The length l of one saw-tooth of the alignment control layer 50 is 2.0 μm; the height o of a larger portion of the saw-tooth is 0.3 μm and the height p of a smaller portion thereof is 0.1 μm or less. A thickness q of the alignment layer 54 is 0.03 μm. The same is true to the other alignment control layer 48. In the prior art liquid crystal display, a transmittance for black is 0.3% and a contrast is 100, while in this embodiment, the transmittance for black is 0.02% and the contrast is 600 or more.

Figure 13:
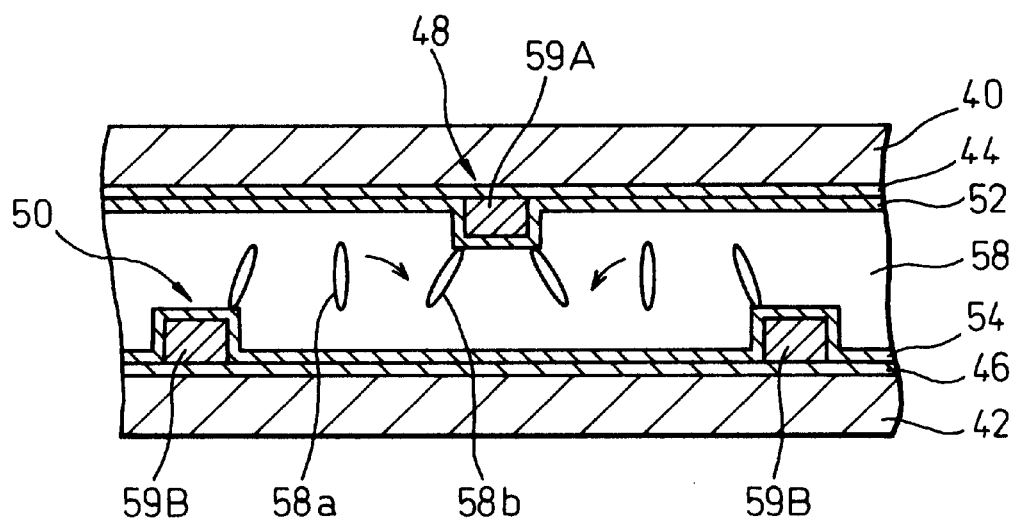
FIG. 13 is a cross-sectional view of the liquid crystal display device according to the fourth embodiment of the present invention.

FIG. 13 illustrates a liquid crystal display device 200 according to the fourth embodiment of the present invention. The liquid crystal display device 200 uses a MVA mode liquid crystal. The liquid crystal display device 200 is composed of a pair of glass substrates 40 and 42, transparent electrodes 44 and 46, vertical alignment layers 52 and 54 and a nematic liquid crystal layer 58 having a negative anisotropy of dielectric constant. In this embodiment, alignment control layers 48 and 50 having a saw-tooth cross-section are not provided all over the surfaces of the electrodes 44 and 46, but are provided in linear alignment control structures 59A and 59B formed on the electrodes 44 and 46, respectively. The linear alignment control structures 59A and 59B may be formed as dielectric or insulating projections or recesses on the electrodes 44 and 46.

Figure 14:
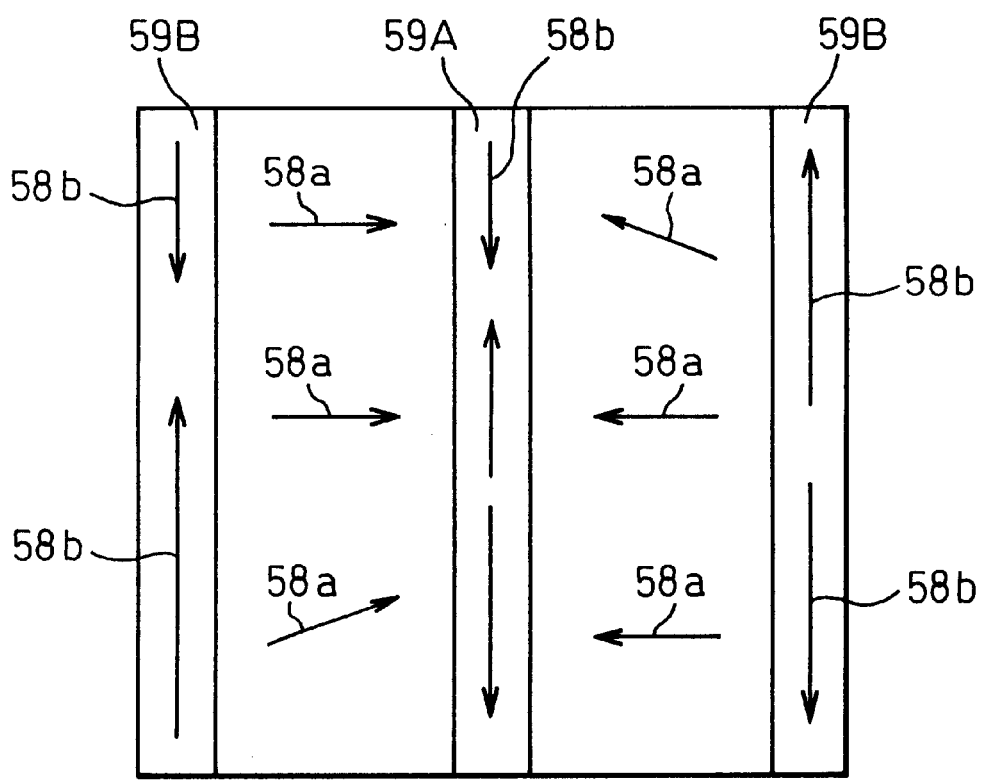
FIG. 14 is a schematic plan view of a basic form of the liquid crystal display device of FIG. 13.

FIG. 14 is a schematic plan view of a basic form of the liquid crystal display device 200 of FIG. 13, illustrating the relationship between the linear alignment control structures 59A provided on one substrate 40 and those 59B provided on the other substrate 42. The linear alignment control structures 59A and 59B on both the substrates extend in parallel to each other, while the linear alignment control structures 59A on the one substrate 40 are shifted from those 59B on the other substrate 42.

When no voltage is applied to the liquid crystal, liquid crystal molecules are aligned generally vertically to the vertical alignment layers 52 and 54 (to the surfaces of the substrates 40 and 42). More specifically, the liquid crystal molecules 58a positioned between the linear alignment control structures 59A on one substrate 40 and those 59B on the other substrate 42 are vertically aligned relative to the vertical alignment layers 52 and 54 (to the surfaces of the substrates 40 and 42). On the other hand, the liquid crystal molecules 58b positioned on the linear alignment control structures 59A or 59B are vertically aligned relative to the linear alignment control structures 59A or 59B but not to the surface of the substrates 40 and 42. That is, the liquid crystal molecules 58b are aligned obliquely to the surfaces of the substrates 40 and 42.

When a voltage is applied to the liquid crystal, the liquid crystal molecules lie parallel to the surfaces of the substrates 40 and 42. In this case, since the liquid crystal molecules 58b positioned on the linear alignment control structures 59A and 59B were aligned obliquely to the surface of the substrates 40 and 42 when the voltage is not applied, the liquid crystal molecules 58a positioned between the linear alignment control structures 59A on one substrate 40 and those 59B on the other substrate 42 lie in conformity with the inclination of the liquid crystal molecules 58b toward the vertical alignment layer 52 as shown by the arrow in FIG. 13. Thus, even if the vertical alignment layers 52 and 54 are not subjected to an alignment treatment such as rubbing or light irradiation, the liquid crystal molecules lie in the predetermined direction provided the linear alignment control structures 59A and 59B exist, whereby the alignment of the liquid crystal is controllable.

Assuming that FIGS. 13 and 14 illustrate a zone of one pixel, the liquid crystal molecules positioned on either side of the linear alignment control structures 59A lie in the opposite directions, respectively, toward the linear alignment control structures 59A. In such a manner, there are a plurality of zones in one pixel, having different states of alignment, to provide a liquid crystal display with an excellent coverage characteristic; in other words, a so-called alignment division is achieved.

Arrows in FIG. 14 show the directions in which the liquid crystal molecules 58a and 58b lie. The liquid crystal molecules 58a positioned between the linear alignment control structures 59A on one substrate 40 and the linear alignment control structures 59B on the other substrate 42 lie in the opposite direction to each other toward the alignment control structures 59A, as described above. On the other hand, the liquid crystal molecules 58b positioned on the linear alignment control structures 59A and 59B are aligned in parallel to the linear alignment control structures 59A and 59B as shown by arrows. At this time, the directions (tilting directions) of the liquid crystal molecules 58b are slightly different from each other in every minute area. Therefore, it is desired that the minute areas wherein the liquid crystal molecules 58b are controlled. Some liquid crystal molecules, among the liquid crystal molecules 58a, may not lie perpendicular to the linearly arranged alignment control structures 59A and 59B, depending on the combination of the lying directions of the liquid crystal molecules 58b on the alignment control structures 59A and 59B.

Figure 15A:
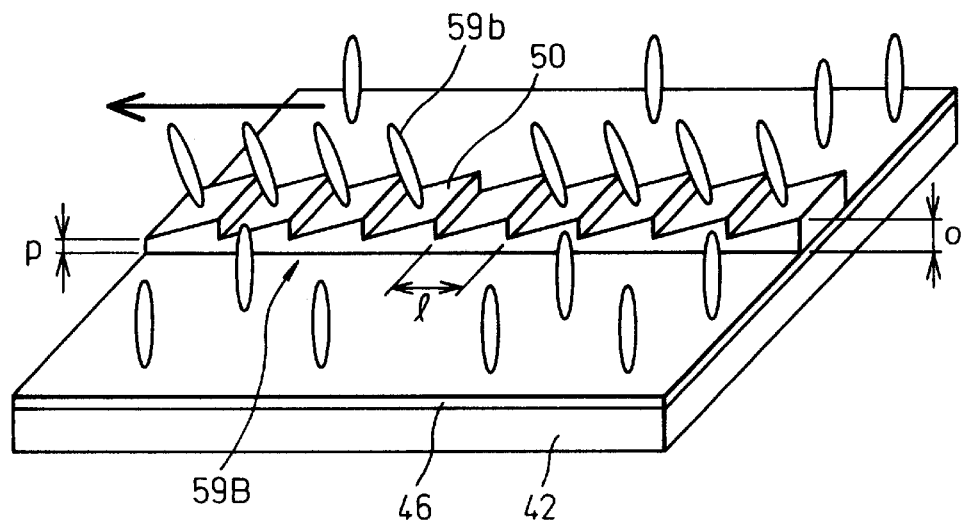
FIG. 15(A) is a perspective view of the linear alignment control layer of FIGS. 13 and 14.

FIG. 15A illustrates an alignment control layer 50 provided on the linear alignment control structure 59B. The vertical alignment layer 54 is provided on the structure shown in FIG. 15A. In this case, the linear alignment control structure 59B itself is formed as a structure having a saw-saw-tooth cross-section (alignment control layer 50). The length l of one tooth of the alignment control layer 50 is 2.0 $\mu$m, the height o of a larger portion of the saw-tooth of the alignment control layer 50 is 1.6 $\mu$m, and the height p of a smaller portion of the saw-tooth thereof is 1.0 $\mu$m or less. The width of the alignment control layer 50 is 10 $\mu$m, the gap width between the layers is 25 $\mu$m, and the cell thickness is 4.2 $\mu$m. The same is true of the alignment control layer 48 provided on the other linear alignment control structure 59A.

Figure 15B:
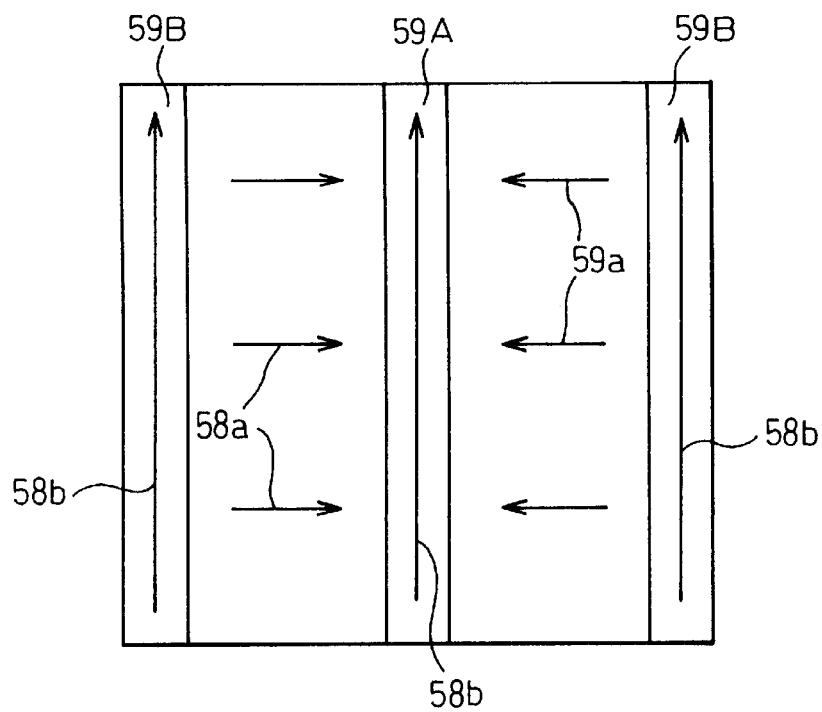
FIG. 15(B) is a schematic plan view of the liquid crystal device of FIG. 13 having the linear alignment control layer of FIG. 15(A)

FIG. 15(B) shows the alignment of the liquid crystal molecules of the liquid crystal display device having the alignment control layer 50 of FIG. 15(A).

Since the angle of the liquid crystal molecules 59b positioned on the linear alignment control structures 59A and 59B relative to the substrates are controlled by the slopes of the alignment control layers 48 and 50, they lie in the fixed direction when the voltage is applied. Therefore, the alignment of the liquid crystal molecules 59b positioned on the linear alignment control structures 59A and 59B is also controllable. The liquid crystal molecules lie perpendicular to the alignment control structures.

Figure 16:
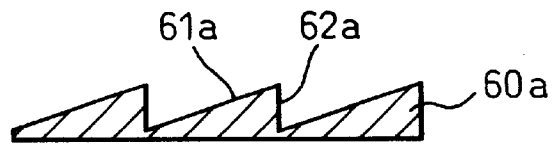
FIG. 16 is a cross-sectional view of a modification of the alignment control layer.
Figure 17:
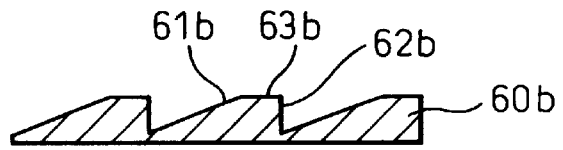
FIG. 17 is a cross-sectional view of another modification of the alignment control layer.
Figure 18:
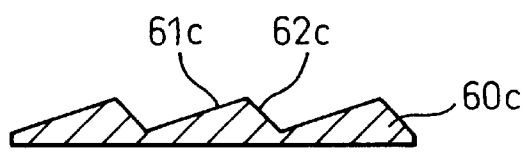
FIG. 18 is a cross-sectional view of another modification of the alignment control layer.

FIGS. 16 to 18 show modifications of the alignment control layer according to the present invention.

An alignment control layer 60a shown in FIG. 16 has a saw-tooth cross-section formed of saw-tooth units each having a first slope 61a inclined at a predetermined angle relative to the substrate surface, and a surface 62a generally vertical to the substrate surface.

An alignment control layer 60b shown in FIG. 17 has a saw-tooth cross-section formed of saw-tooth units each having a first slope 61b inclined at a predetermined angle relative to the substrate surface, a surface 62b generally vertical to the substrate surface, and a surface 63b generally in parallel to the substrate surface.

An alignment control layer 60c shown in FIG. 18 has a saw-tooth cross-section formed of saw-tooth units each having a first slope 61c inclined at a predetermined angle relative to the substrate surface, and a surface 62c inclined opposite to the first slope 61c.

As described above, any configuration may be adopted for the alignment control layer provided that it is capable of titling the liquid crystal molecules in one direction as a whole. In this regard, although the width of the slope of the alignment control layer is depicted to be equal to the length of the liquid crystal molecule in the drawings for facilitating the understanding of the explanation, the width of the slope is actually much larger than the length of the liquid crystal molecule.

Figure 19:
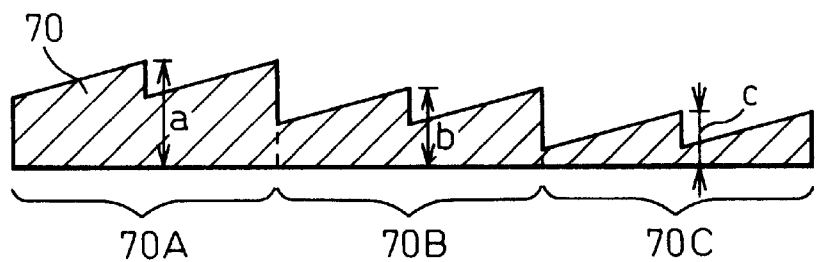
FIG. 19 is a cross-sectional view of another modification of the alignment control layer.
Figure 20:
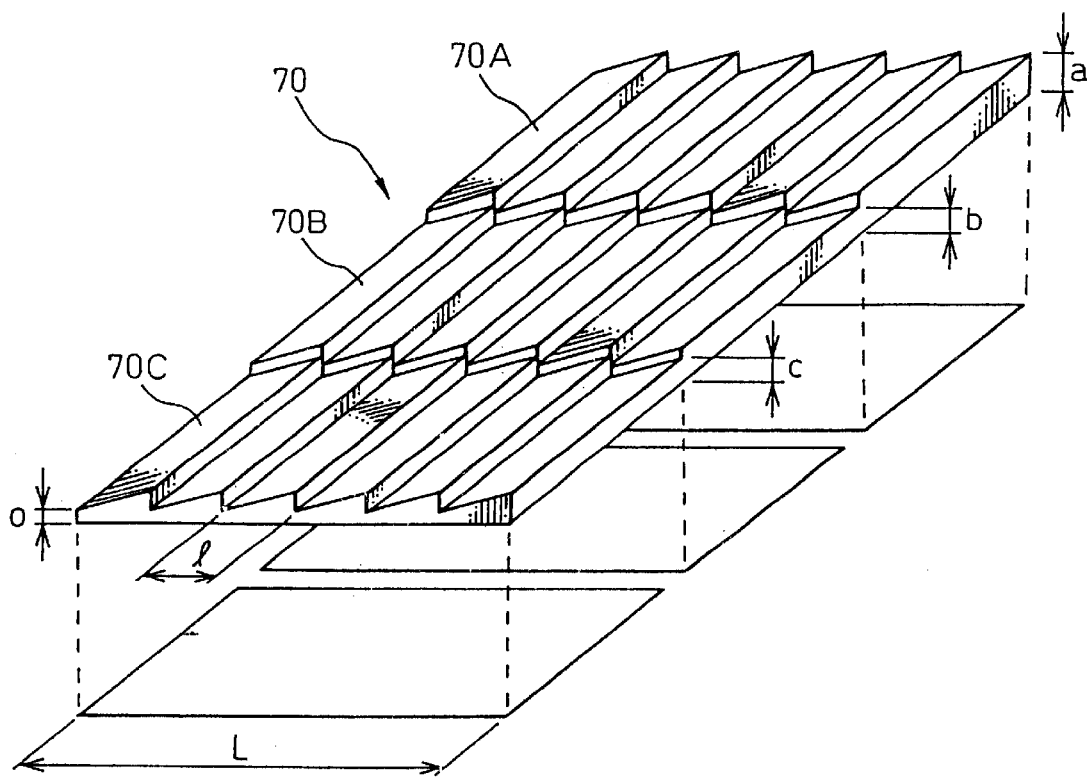
FIG. 20 is a perspective view of the alignment control layer of FIG. 19.
Figure 21:
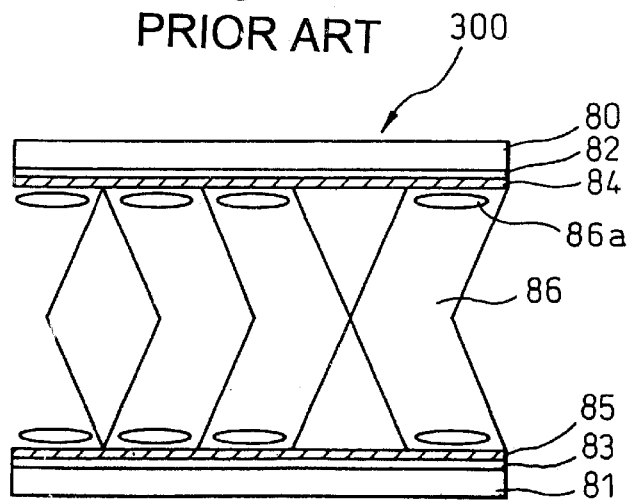
FIG. 21 is a view illustrating a prior art.

FIGS. 19 and 20 illustrate another modification of the alignment control layer.

An alignment control layer 70 has a varying thickness; i.e., it includes a plurality of sections, each having a top height of the slope different from the other. For example, in the section 70A, a top height of the slope in the alignment control layer is a (=0.7 μm);

in the section 70B, that is b (=0.4 μm); and in the section 70C, that is c (=0.25 μm). There is a relationship a>b>c in heights thereof. A bottom height of the slope p is 0.1 μm or less. A length l of one saw-tooth is 2.0 μm, and a length L of one pixel is 300 μm.

When the above-mentioned alignment control layer 70 is used, it is possible to vary a cell thickness in every section in the liquid crystal display device to result in a multigap liquid crystal panel. Thus, by suitably selecting a thickness of the alignment control layer (a height of slope of the alignment control layer) in the R, G, B color sections of the liquid crystal display, optimum retardation values are obtainable in the respective R, G, B color sections in a color liquid crystal panel. FIG. 20 illustrates an example wherein a cell thickness is 4.2 μm in the section 70B (pixel B) and Δnd of liquid crystal material is 0.082.

As described above, according to the liquid crystal display device of the present invention, a pretilt angle of the liquid crystal molecule can be optionally selected to eliminate problems caused by an improper pretilt angle, resulting in a liquid crystal display device having an excellent display quality. Also, this facilitates and widen the application of a light alignment method, for example, by irradiation with ultraviolet light.

What is claimed is:

1. A liquid crystal display device comprising:

a pair of substrates;

a nematic liquid crystal layer inserted between the pair of substrates;

an alignment control layer provided on the inner side of at least one of the substrates, said alignment control layer having a saw-tooth cross section with slopes inclining at an angle relative to the substrate;

an alignment layer covering the alignment control layer; and the alignment layer being a vertical alignment layer, a pretilt angle θ of the liquid crystal relative to the surface of the substrate being represented by the following equation:

θ=θp+α wherein α is the inclination of the slopes of the alignment control layer relative to the surface of the substrate and θp is a pretilt angle of the liquid crystal relative to the alignment control layer.

2. A liquid crystal display device as defined by claim 1, wherein said alignment control layer includes a plurality of saw-tooth sections having varying heights.

3. A liquid display device comprising:

a pair of substrates;

a nematic liquid crystal layer inserted between the pair of substrates;

an alignment control layer provided on the inner side of at least one of the substrates, said alignment control layer having a saw-tooth cross section with slopes inclining at an angle relative to the substrate;

an alignment layer covering the alignment control layer; and the alignment layer being a vertical alignment layer, the inclination of the slopes of the alignment control layer relative to the surface of the substrate being α a pretilt angle of the liquid crystal relative to the alignment control layer being approximately 90°.

4. A liquid crystal display device comprising:

a pair of substrates;

a nematic liquid crystal layer inserted between the pair of substrates;

linear alignment control structures arranged in a spaced apart relationship in each of the substrates, such that said linear alignment control substrates of one of the substrates do not directly opposed said linear alignment control structures of the other structures of the other of the substrates said linear alignment control structures of one of the substrates being displaced from said linear alignment control structures of the other substrate, so that the liquid crystal molecules on either side of each linear alignment control structure are aligned opposite to each other;

an alignment layer covering the alignment control layer; and each of said liner alignment control structures having a saw-tooth cross section with slopes inclining at an angle relative to the substrate.

5. A liquid crystal display device comprising:

a pair of substrates;

a smectic liquid crystal layer inserted between the pair of substrates;

an alignment control layer provided on the inner side of each of the substrates, said alignment control layer having a saw-tooth cross section with slopes inclining at an angle relative to the substrate;

the slope of the saw-tooth of the alignment control layer of one of the substrates being not parallel to the slope of the saw-tooth of the alignment control layer of the other substrate; and an alignment layer covering the alignment control layer;

said alignment layer being treated such that liquid crystal molecules are aligned in a direction determined by the treatment and a pretilt angle of the liquid crystal is substantially zero.

6. A liquid crystal device as defined by claim 5, wherein said alignment control layer includes a plurality of saw-tooth sections having varying heights.

7. A liquid crystal display device as defined by claim 5, wherein the treatment includes irradiating polarized ultraviolet light onto said alignment layer.

8. A liquid crystal display device as defined by claim 5, wherein the treatment includes photodimerization.

* * * * *

UNITED STATES PATENT AND TRADEMARK OFFICE
CERTIFICATE OF CORRECTION

PATENT NO.    : 6,362,863 B1
DATED         : March 26, 2002
INVENTOR(S)   : Kataoka et al.

It is certified that error appears in the above-identified patent and that said Letters Patent is hereby corrected as shown below:

Column 10,
Line 13, insert -- , -- after "α"
Lines 5-15, should read as follows:
  -- linear alignment control structures arranged in a spaced apart relationship in each of the substrates, said linear alignment control structures of one of the substrates being displaced from said linear alignment control structures of the other substrate, such that said linear alignment control structures of one of the substrates do not directly oppose said linear alignment control structures of the other of the substrates, so that the liquid crystal molecules on either side of each linear alignment control structure are aligned opposite to each other; --

Signed and Sealed this

Twenty-fourth Day of June, 2003

JAMES E. ROGAN
*Director of the United States Patent and Trademark Office*